June 1, 1937.  R. R. NYDEGGER  2,082,023
AUTOMATIC CONTROL MEANS FOR MECHANICAL REFRIGERATORS
Original Filed July 29, 1932   2 Sheets-Sheet 1
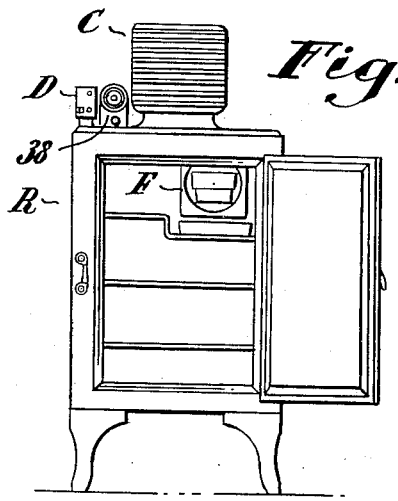
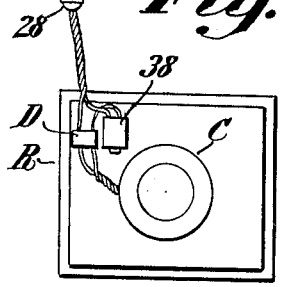
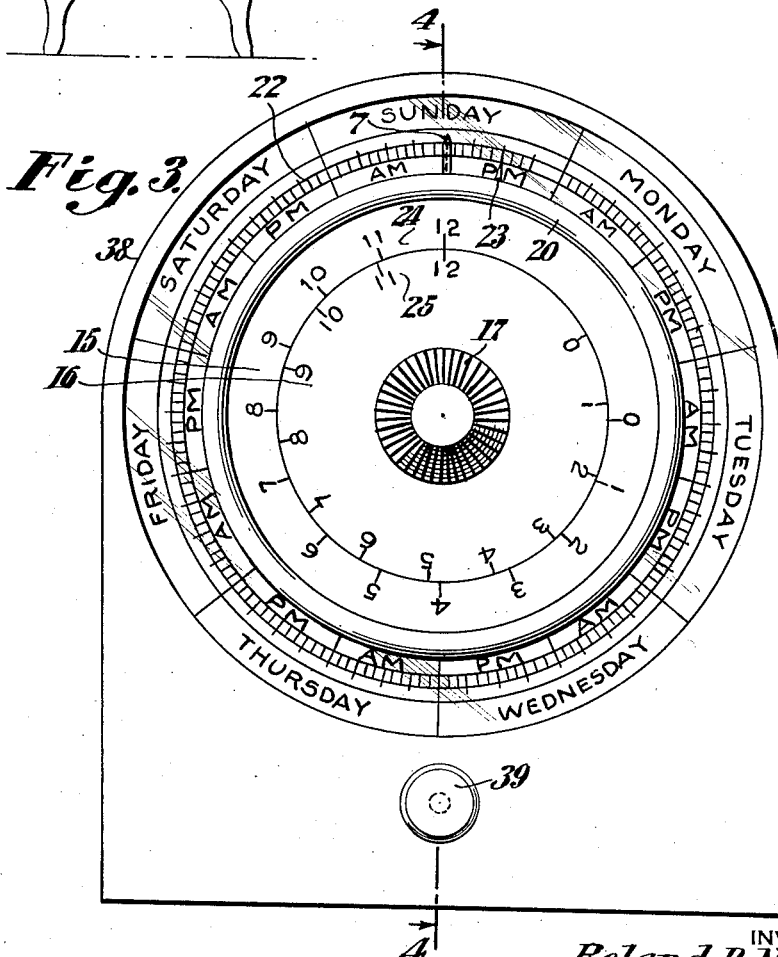
INVENTOR
Roland R. Nydegger
BY
ATTORNEYS June 1, 1937. R. R. NYDEGGER 2,082,023
AUTOMATIC CONTROL MEANS FOR MECHANICAL REFRIGERATORS
Original Filed July 29, 1932 2 Sheets-Sheet 2
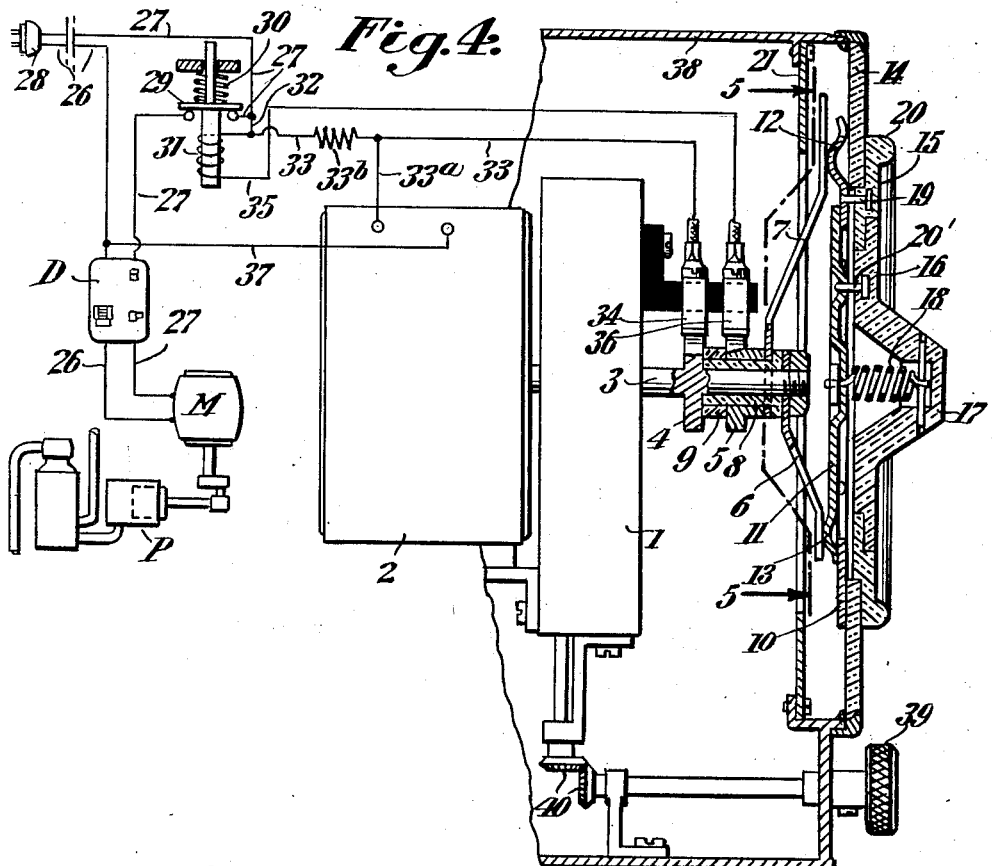
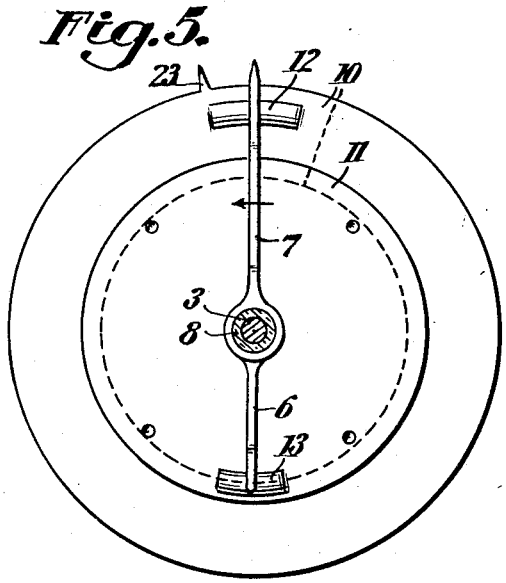
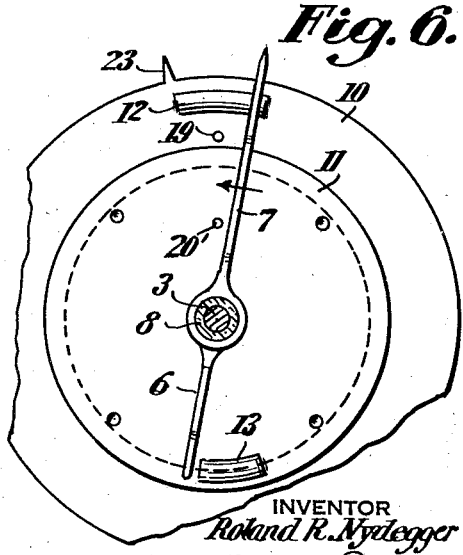
INVENTOR
Roland R. Nydegger
BY
ATTORNEYS Patented June 1, 1937

2,082,023

UNITED STATES PATENT OFFICE 2,082,023

AUTOMATIC CONTROL MEANS FOR MECHANICAL REFRIGERATORS

Roland R. Nydegger, Wilmington, Del.

Original application July 29, 1932, Serial No. 626,012. Divided and this application April 4, 1933, Serial No. 664,321. Renewed October 24, 1936

11 Claims. (Cl. 200—36)

An important object of the present invention is to provide a satisfactory apparatus for automatically interrupting the operation of a mechanical refrigerator at a predetermined time to permit the ice to melt from the freezing unit; to provide such an apparatus which is conveniently pre-settable to select the time for de-icing and also to determine the duration of the de-icing period; to provide a clock-controlled apparatus which is pre-settable to select any day of the week and any time of the selected day for de-icing; and to provide such an apparatus designed for convenient operative connection to a standard form of mechanical refrigerator.

Other objects of the invention will appear hereinafter.

In the drawings, Fig. 1 is a front view of a standard form of electrical refrigerator, equipped with my automatic control device;

Fig. 2 a top plan view of said refrigerator and control device;

Fig. 3 a front view of the control device upon a larger scale;

Fig. 4 a vertical section on the line 4—4 of Fig. 3 and showing diagrammatically the operative connections of the control device with the mechanism of the refrigerator which circulates the freezing fluid;

Fig. 5 a section on the line 5—5 of Fig. 4 showing the cooperation of the clock-driven electrical contacts with the manually adjustable contacts to interrupt the refrigeration; and Fig. 6 a view similar to Fig. 5 showing one of the contacts adjusted to vary the period of interruption.

This application is a division of my co-pending U. S. patent application, Serial No. 626,012, filed July 29, 1932.

The automatic control device is illustrated in connection with a commercial form of electrically operated refrigerator R having mounted upon the top of its cabinet a bank of condensing coils C for the refrigerant fluid and a compressor unit enclosed by said bank and comprising an electric motor M and a pump P driven by said motor, as shown diagrammatically in Fig. 4. The pump has the usual fluid connections, not shown, with the condenser coils and with the freezing unit F to withdraw the refrigerant fluid from the freezing unit, compress the fluid, deliver it to the coils and thence back to the freezing unit. Ordinarily the operation of the motor M is controlled by a control device D which includes a manually operable switch to open and close the motor circuit, a thermostat to start and stop the motor in response to temperature changes in the freezing unit when said switch is closed, an overload protective device and a starting relay. My invention involves no change in this control device and detail illustration of the latter is thought to be unnecessary. My automatic control device is connected in circuit with the standard control device D in a manner to enable either device to be operated without interference from the other.

The automatic control device includes a clock mechanism 1 driven by an electric motor 2. The clock mechanism may be of any suitable form and it is thought to be unnecessary to illustrate it in detail. It has an arbor 3 which is rotated one full turn in a week's time by the motor-driven mechanism. Two disk-like electrical contacts 4 and 5 are fixed to rotate with the arbor. Also fixed to rotate with the arbor are two radially extending contact fingers 6 and 7. These fingers are disposed in permanent diametrical relation. The finger 6 is electrically connected, through the arbor, with the contact 4. The contact 5 and finger 7 are electrically connected with each other, but insulated from the arbor, the contact 4 and the finger 6 by insulation sleeves 8 and 9.

In advance of the contact fingers 6 and 7 are two metal electrical contact plates 10 and 11. Plate 10 is of flat annular form and has a raised arcuate portion at its rear face forming a contact 12 engageable by the contact finger 7. Plate 11 is of circular disk form and its edge margin bears against the rear face of the plate 10 around the margin of the aperture therein. Plate 11 also has a raised arcuate portion forming an electrical contact 13 engageable by the contact finger 6. The plates are disposed concentric with the axis of the arbor, and the arcs of the plate contacts 12 and 13 subtend the same angle around said axis. In the present instance said angle is that through which the arbor and the radial contact fingers are rotated in a period of twelve hours. The angle may be varied, however.

Directly in advance of the contact plates 10 and 11 is a circular glass panel 14 having a central circular aperture. An annular dial plate 15 bears against the forward face of said panel and has a circular relieved portion rotatably fitted in the panel aperture. A circular dial plate 16 of less diameter than plate 15 is rotatably mounted on the latter and the inner edge of the plate 15 and the outer edge of the plate 16 have a rabbeted interfit, with the plate 16 forwardly overlapping the plate 15. Centrally the plate 16 has a forwardly projecting knob 17 for rotating it. The knob is hollow and within it is a fore-and-aft tension spring 18 having its forward end anchored to the knob and its rear end anchored to the contact plate 11. The tension of said spring holds the plate 11 in frictional engagement with the plate 10, holds the dial plate 16 in frictional engagement with the dial plate 15 and holds the contact plate 10 and the dial plate 15 in frictional engagement with the glass panel 14, to yieldably resist rotation of said parts. The dial plates are made of insulating material. A pin 19 locks the plates 10 and 15 to rotate together, and the plate 15 has a forwardly projecting bead 20 around its outer edge to grasp for turning said plates. Another pin 20' locks the plates 11 and 16 to rotate together. All of the plates are concentric with the axis of the clock arbor. By rotation of both dial plates and their connected contact plates in unison the contacts 12 and 13 are positioned so that the contact fingers 6 and 7 will engage them at a selected time, and by rotation of the dial plate 16 and its connected contact plate 10 independently of the other plates, the contact 13 is shifted relatively to the contact 12 to vary the duration of contact of the fingers with the contacts 12 and 13 simultaneously. These adjustments will be described more specifically hereinafter.

Back of the contact plates 10 and 11 is a dial plate 21 bearing a circular time scale 22 visible through the glass panel and over the edge of the dial plate 15. This scale has graduations and designations for the days of the week, and graduations indicating the hours of each day. The contact finger 7 is extended to form a hand or pointer traversing the scale, and the contact plate 9 has a pointer 23 selectively registrable with any of the scale graduations to pre-select the day and hour of the de-icing period.

The degree of rotation of the dial plate 16 relatively to the dial plate 15 is indicated by two circular scales 24 and 25, on plates 15 and 16 respectively. Scale 24 has a series of equally spaced graduations numbered from "0" to "12". Scale 25 also has a series of graduations similarly numbered but with the space therebetween exceeding the space between the graduations of scale 24 by an angular extent around the axis of the arbor equal to one-twelfth of the angle subtended by the arcuate contact 12 or by the contact 13. Therefore, when corresponding numbers of the two scales are registered the contact fingers 6 and 7 will remain in simultaneous engagement with the contacts 12 and 13 for a number of hours corresponding to the numbers in register. When the zeros of the two scales are in register the contact 13 is so positioned with relation to contact 12 that the contact fingers cannot simultaneously engage both contacts. This adjustment is made to prevent automatic de-icing.

The motor M of the refrigerator has a circuit including two wires 26 and 27 joined to a plug 28 for connection to line wires. Wire 26 leads through the control device D to the motor M. Wire 27 has a switch 29 normally held closed by a spring 30 and adapted to be opened by the automatic control device. From said switch, wire 27 leads through the ordinary control device D to the motor. The switch 29 is opened against the spring resistance by a solenoid 31 controlled by the automatic device. One end of the solenoid coil has a circuit connection 32 with wire 27 and also a connection 33 with a brush 34 in engagement with the contact 4 on the clock arbor. The other end of the solenoid coil has a circuit connection 35 with a brush 36 in engagement with the contact 5 of the arbor. The clock motor 2 has a circuit connection 37 with the wire 26 at a point in advance of the control device D and a circuit connection with the wire 27 through a conductor 33ª leading to the conductor 33, then through a resistance 33ᵇ in conductor 33, and through the connection 32. Ordinarily, when the electrical connection between conductors 33 and 35 is broken at the contact points of the automatic control device, the current for operation of the clock motor is compelled to flow through the resistance 33ᵇ and thence to the motor through conductor 33ª. When, however, electrical connection between the conductors 33 and 35 is made by the automatic device there is established a circuit including the conductors 26, 37, 33ª, 33 through the contacts of the timing device and conductor 35, the solenoid 31 and the conductors 32 and 27. This circuit avoids the resistance 33ᵇ. The resistance 33ᵇ permits sufficient current to pass through it for the purpose of operating the motor 2 when the circuit between the conductors 33 and 35 is broken. When, however, that circuit is completed through the contacts of the timing device the resistance is sufficient to prevent the flow of current and the current then passes from 27 through 32, through the solenoid coil and conductor 35 and thence through conductors 33 and 33ª to the motor and from the motor to conductor 26, through conductor 37. The resistance 33ᵇ is sufficient to divert the current through the path of least resistance which path is through the solenoid coil. When, however, the circuit is broken through the conductors 33 and 35 the resistance 33ᵇ is not sufficient to prevent the passage of current from 32 to 33ª. The automatic control device and the switch 29 are preferably enclosed in a suitable casing 38 to form a compact unit.

When no de-icing period has been selected the zeros of the dials 15 and 16 are in register and the contact 13 is then so disposed with relation to the contact 12 as to prevent simultaneous engagement of the contact fingers 6 and 7 with said contacts. The automatic control device is then incapable of closing the circuit of the solenoid 31 so that the switch 29 is held closed by its spring and the motor M is operated, subject only to the control device D. The clock motor 2 is operated through its circuit connection independently of both the control device D and the automatic control device and the hand of the clock traverses the dial 22 without interruption. At the front of the casing 38 is a rotatable knob 39 having gear connections 40 with the clock mechanism for setting the hand when necessary.

To pre-select a time to interrupt the operation of the refrigerator and allow an accumulation of ice to melt from the freezing unit, the dial 15 is rotated to bring the pointer 23 of its connected contact plate 10 into register with the designation of the selected day on the dial 22 and also into register with the mark of the hour selected for the conclusion of the de-icing period. Then, the duration of the de-icing period is predetermined by rotating the central dial 16 relatively to dial 15 to bring the desired hour numbers on said dials in register. When the clock-driven contact fingers 6 and 7 engage both the contacts 12 and 13 the contact fingers will be electrically connected through the plates 10 and 11 to close the solenoid circuit and open the switch 29. The contact fingers 6 and 7 will remain in simultaneous contact with their respective contacts 13 and 12 for the number of hours indicated by the registering numbers, and the switch 29 will be held open by the solenoid for that period and the control circuit of the motor M will be broken. When either of the contact fingers moves out of engagement with its respective contact the solenoid circuit is broken and the switch 29 is closed by its spring to start the motor. In Fig. 3 the dials 15 and 16 are shown adjusted for a de-icing period to occur on Sunday. The pointer 23 is shown adjusted for the conclusion of the de-icing period at 6 p. m. Sunday and the "12" of dial 16 is in register with the "12" of dial 15. The de-icing period will then continue for twelve hours, from 6 a. m. to 6 p. m. The dials may remain set for automatic recurrence of the de-icing period on the same day of successive weeks or they may be re-set to select a convenient day and a convenient hour when refrigeration is not required. The automatic device is readily cut out of service when the de-icing period has not been decided upon by merely turning the central dial 15 to register its "0" with that of the dial 16.

While I have shown and described my invention as employed in connection with an electric refrigerator it may be employed to control other types of mechanical refrigerators.

What I claim is:

1. A control mechanism for an electric circuit, comprising an automatic control apparatus pre-settable to close said circuit at a predetermined time and for a predetermined duration and comprising a motor, a pair of contacts insulated from each other and rotatable in unison about a common axis through one complete circle a week by said motor, a pair of adjustable contacts constantly electrically connected and adapted for manual rotative adjustment in unison co-axially of said motor-driven contacts and being respectively engageable by the latter, one of said adjustable contacts being rotatably adjustable manually relatively to the other to different positions for varying duration of simultaneous contact of the motor-driven contacts with the adjustable contacts, a circular dial concentric with the axis of the contacts and indicating the days of the week and the hours of the days, the adjustable contacts being adjustable in unison with reference to said dial to pre-select the day and hour for closing the circuit, and dial means to indicate the degree of relative adjustment of the adjustable contacts and the duration of the closed circuit period.

2. A control mechanism for an electric circuit, comprising an automatic control apparatus pre-settable to close said circuit at a predetermined time for a predetermined duration and comprising a motor, a pair of contacts insulated from each other and rotatable in unison about a common axis through one complete circle a week by said motor, a pair of adjustable contacts constantly electrically connected and adapted for manual rotative adjustment in unison coaxially of said motor-driven contacts and being respectively engageable by the latter, and a circular dial concentric with the axis of the contacts and indicating the days of the week and the hours of the days, the adjustable contacts being adjustable in unison with reference to said dial to pre-select the day and hour for closing the circuit.

3. A control mechanism for an electrical circuit, comprising an automatic control device pre-settable to close said circuit at a predetermined time and comprising a plurality of concentric dials including a fixed outer dial having a circular series of indications of the days of the week and the hours of the days, a circular rotatable intermediate dial having a series of equally spaced numbered hour designations therearound, a circular inner dial rotatable with said intermediate dial and also rotatable relatively thereto and having therearound a series of equally spaced hour designations numbered similarly to the designations on the intermediate dial but spaced a different distance part, an index registrable selectively with the day and hour indications by rotation of said intermediate dial, a motor, electrical contact means rotatable by said motor, and contacts adjustable by rotation of said inner and intermediate dials and cooperable with said motor driven contact means to cause the closing of said circuit at the time indicated on the outer dial by said index and for a duration indicated by corresponding registered hour numbers on the intermediate and inner dials.

4. A pre-settable time switch mechanism to control an electric circuit, comprising a motor, a pair of circuit closing elements rotatable by said motor in unison and at a uniform rate about a common axis, a pair of adjustable circuit closing elements both adapted for manual rotative adjustment coaxially of said motor driven elements and being respectively engageable by the latter to close the circuit, one of said adjustable elements being rotatably adjustable manually relatively to the other to different positions for varying duration of circuit closure, a fixed circular time indicating dial concentric with the axis of the circuit closing elements to indicate the adjustment of one of said adjustable elements to pre-select the time of circuit closure, and means to indicate the degree of relative adjustment of the adjustable elements and the duration of the closed circuit period.

5. A pre-settable time switch mechanism to control an electric circuit, comprising a motor, a pair of circuit closing elements rotatable by said motor in unison and at a uniform rate about a common axis, a pair of adjustable circuit closing elements both adapted for manual rotative adjustment coaxially of said motor driven elements and being respectively engageable by the latter to close the circuit, one of said adjustable elements being rotatably adjustable manually relatively to the other to different positions for varying duration of circuit closure, a fixed circular time indicating dial concentric with the axis of the circuit closing elements to indicate the adjustment of one of said adjustable elements, to pre-select the time of circuit closure, means to indicate the degree of relative adjustment of the adjustable elements and the duration of the closed circuit period, and manually rotatable means to adjust said adjustable elements from in front of said dial and said indicating means.

6. A pre-settable time switch mechanism to control an electric circuit, comprising a motor, a pair of circuit closing elements insulated from each other and rotatable by said motor in unison and at a uniform rate about a common axis, a pair of adjustable circuit closing elements adapted for manual rotative adjustment in unison coaxially of said motor driven elements and being respectively engageable by the latter to close the circuit, one of said adjustable elements being rotatably adjustable manually relatively to the other to different positions to vary the duration of circuit closure and also to prevent circuit closure, a fixed time indicating dial having a circular series of graduations concentric with the axis of the switch closing elements and indicating the days of the week and the hours of the days, means to adjust the adjustable circuit closing elements in unison with reference to said dial to pre-select the time of circuit closure, and additional dial means to indicate the degree of relative adjustment of the adjustable elements and the duration of the closed circuit period.

7. A pre-settable time switch mechanism to control an electric circuit, comprising a plurality of concentric dials including a fixed outer dial having a circular series of time indications, a rotatable dial having a series of equally spaced numbered time indications around its axis, another rotatable dial also having a series of equally spaced time indications around its axis and numbered similarly to the time indications on said first rotatable dial but spaced a different distance apart, an index registerable selectively with the time indications on said fixed dial by rotation of one of said rotatable dials, circuit control elements operatively connected to said rotatable dials for rotative adjustments in unison by rotating said dials in unison and for relative rotative adjustment by rotating one of the rotatable dials relatively to the other to vary the times of circuit closure and circuit opening as indicated by the position of said index with relation to the fixed dial and by the registration of correspondingly numbered graduations on the rotatable dials, a motor, and circuit control means rotatable by said motor and cooperable with said adjustable elements to effect the circuit closure and opening at the times indicated on the dials.

8. A time switch mechanism to control an electric circuit, comprising a plurality of concentric dials including a fixed time indicating dial, a time indicating dial rotatively adjustable with reference to said fixed dial, and a time indicating dial rotatively adjustable with reference to said first adjustable dial, motor-driven circuit-closing means, and circuit closing means connected to said adjustable dials and adjustable thereby to cooperate with said motor-driven circuit-closing means to close and open the circuit at times in accordance with the adjustments of said rotatively adjustable dials.

9. A pre-settable time switch mechanism to control an electric circuit, comprising a pair of circuit controlling elements both rotatably adjustable and one rotatably adjustable relatively to the other, means to indicate said relative adjustment including a dial fixed to rotate with one of the elements and having a series of equally spaced, numbered time indications around its axis and another dial fixed to rotate with the other element and also having a series of equally spaced time indications around its axis numbered similarly to said time indications on the first dial and registerable selectively therewith but spaced a different distance apart, and power-driven circuit control means cooperable with said adjustable elements to effect closing and opening of the circuit at times in accordance with the adjustments of said elements.

10. A time switch device comprising a panel having a circular aperture; an annular member rotatably fitted in said aperture and bearing against the forward face of the panel around said aperture; a central disk rotatably fitted in said annular member and bearing against the forward face thereof; an apertured plate bearing against the rear face of the panel around the margin of the panel aperture and locked for rotation with said annular member and bearing an electrical contact; a rear plate bearing against the rear face of said apertured plate and locked for rotation with said disk and bearing an electrical contact, said two contacts being spaced outward from the axis of rotation of the said disk and annular member, whereby they may be adjusted around an axis by rotation of the annular member and disk; a tension spring centrally connecting said rear plate and disk for the purpose set forth; and power driven circuit-closing means cooperable with said contacts to close and open a circuit at times according to the adjustments of the contacts.

11. A pre-settable time switch mechanism to control an electric circuit comprising a motor, circuit-controlling means rotatable by said motor about an axis, a pair of adjustable circuit-controlling devices each mounted for rotative adjustment coaxially of said motor driven circuit-controlling means and cooperable with the latter to close and open the circuit at times according to the adjustments of said adjustable devices, a spring holding said adjustable devices in mutual contact to form a yieldable frictional operative connection between said adjustable devices enabling them to be rotatably adjusted in unison and permitting one device to be rotatably adjusted relatively to the other, a circular time-indicating dial, indicating means cooperable with said dial to indicate the adjustments of one of said adjustable devices, and cooperable time-indicating means borne by said adjustable devices to indicate their relative adjustments.

ROLAND R. NYDEGGER.